United States Patent
Sexton et al.

(10) Patent No.: US 7,376,942 B2
(45) Date of Patent: May 20, 2008

(54) METHOD OF MANAGING MEMORY FOR CLASS VARIABLES

(75) Inventors: Harlan Sexton, Palo Alto, CA (US);
David Unietis, San Francisco, CA (US);
Peter Benson, Boulder, UT (US)

(73) Assignee: Oracle International Corporation, Redwood Shores, CA (US)

( * ) Notice: Subject to any disclaimer, the term of this patent is extended or adjusted under 35 U.S.C. 154(b) by 707 days.

(21) Appl. No.: 10/434,451

(22) Filed: May 8, 2003

(65) Prior Publication Data

US 2003/0221080 A1 Nov. 27, 2003

Related U.S. Application Data

(60) Provisional application No. 60/378,391, filed on May 8, 2002.

(51) Int. Cl.
*G06F 9/44* (2006.01)
*G06F 9/54* (2006.01)

(52) U.S. Cl. .................................. 717/166; 719/312
(58) Field of Classification Search ............... 717/166; 719/312, 332; 711/153
See application file for complete search history.

(56) References Cited

U.S. PATENT DOCUMENTS

| | | | |
|---|---|---|---|
| 6,675,379 B1 * | 1/2004 | Kolodner et al. | 717/155 |
| 6,738,977 B1 * | 5/2004 | Berry et al. | 719/332 |
| 7,080,382 B2 * | 7/2006 | Sexton et al. | 719/315 |

OTHER PUBLICATIONS

U.S. Appl. No. 09/639,795, filed Aug. 17, 2000, H. Sexton.

* cited by examiner

*Primary Examiner*—Eric B Kiss
(74) *Attorney, Agent, or Firm*—Hickman Palermo Truong & Becker LLP

(57) ABSTRACT

A method and software for managing class variables is described in which a variable-format container for static class variables is provided such that numeric class variables can be accessed directly while other kinds of class variables are accessed via a reference to an object.

14 Claims, 4 Drawing Sheets

METHOD OF MANAGING MEMORY FOR CLASS VARIABLES

RELATED APPLICATIONS

The present application claims the benefit of U.S. Provisional Patent Application Ser. No. 60/378,391 filed on May 8, 2002, the contents of which are hereby incorporated by reference.

FIELD OF THE INVENTION

The present invention relates to run-time environments for computer systems and more particularly to a method of managing memory for class variables.

BACKGROUND OF THE INVENTION

A dynamic run-time environment is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment.

One popular dynamic run-time environment is a JAVA™ virtual machine, which supports a platform-independent, object-oriented language developed by Sun Microsystems. In JAVA™, the attributes and methods for a class of objects are typically defined in a source file, which is compiled into an architecture-neutral object file containing bytecodes that are interpreted in the virtual machine at the target platform. It is common for objects to reference other objects.

Many object-oriented languages, including JAVA™ and C++, support the notion of a class variable, which is allocated once per class, not once per object that is an instance of a class. Class variables are often called "static" because they declared using the "static" keyword in JAVA™ and C++. Typically, the run-time environment allocates memory for class variables the first time the class is encountered or loaded. All objects belonging to the class share the same copy of the class variables, and the class variables can be access through an object belonging to the class or the class itself.

Lately, there has been much interest in using JAVA™ in a multi-user environment that allows multiple users to connect in separate, concurrent sessions to a server system, such as a relational database system. When designing a run-time environment for such a multi-user environment, scalability in terms of the number of simultaneous users who can establish separate sessions is very important.

A significant constraint for user scalability is the size of the memory "footprint" that each session consumes. For example, a server system may have 100 Mb of memory for supporting all the user sessions. If the session memory footprint is 1 Mb, then only 100 user sessions can be supported at one time. Therefore, it is desirable to reduce the session memory footprint to improve scalability. One approach for reducing the session memory footprint in a run-time environment is to allocate a single copy of objects, code, and constant data in a globally shared read-only memory rather than in a session memory that is devoted to a single session. In the example, if 500 Kb of the 1 Mb session memory footprint can be shared between the different sessions, then 500 Kb of the total 100 Mb can be reserved as a global shared read-only memory, and the remaining the 99.5 Mb would available for the individual session memories. Since the session memory requirements has dropped to 500 Kb, a total of 199 user sessions can now be supported. Consequently, session memory reduction by using globally shared read-only memory is a promising approach for improving scalability of the multi-user runtime environment.

Static class variables, however, are generally not shared between different sessions because each user may store individualized values in the static class variable that differs from that of other users. Accordingly, static class variables are not stored in a globally shared read-only memory, and there is therefore a need for managing static class variables as efficiently as possible.

SUMMARY OF THE INVENTION

These and other needs are addressed by the present invention, which stems from the realization that efficiency in accessing numeric class variables is especially crucial to performance. Accordingly, a variable-format container for static class variables is provided such that numeric class variables can be accessed directly while other kinds of class variables are accessed via a reference to an object.

For example, one aspect of the invention pertains to a method and software for managing memory for class variables, in which a class is loaded based on a class file that includes a specification of class variables that belong to the class. The loaded class contains references to a variable-format container object and one or more methods. The variable-format container object is allocated to contain the static class variables belonging to the class and contains a plurality of slots including a first slot storing a numeric value for a first class variable and a second slot storing a reference to an object for a second class variable.

In one embodiment, byte codes for the one or more methods belonging to the class are interpreted to access the first class variable by fetching the numeric value stored at the first slot and access the second class variable by dereferencing the reference.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for managing memory for class variables are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Memory Model

One embodiment of the present invention is illustrated with respect to a memory model that is implemented for a multi-user run-time environment. Accordingly, a detailed description of the memory model for this working example is provided, but the present invention is not limited to this example or to the use of this memory model.

Figure 1:
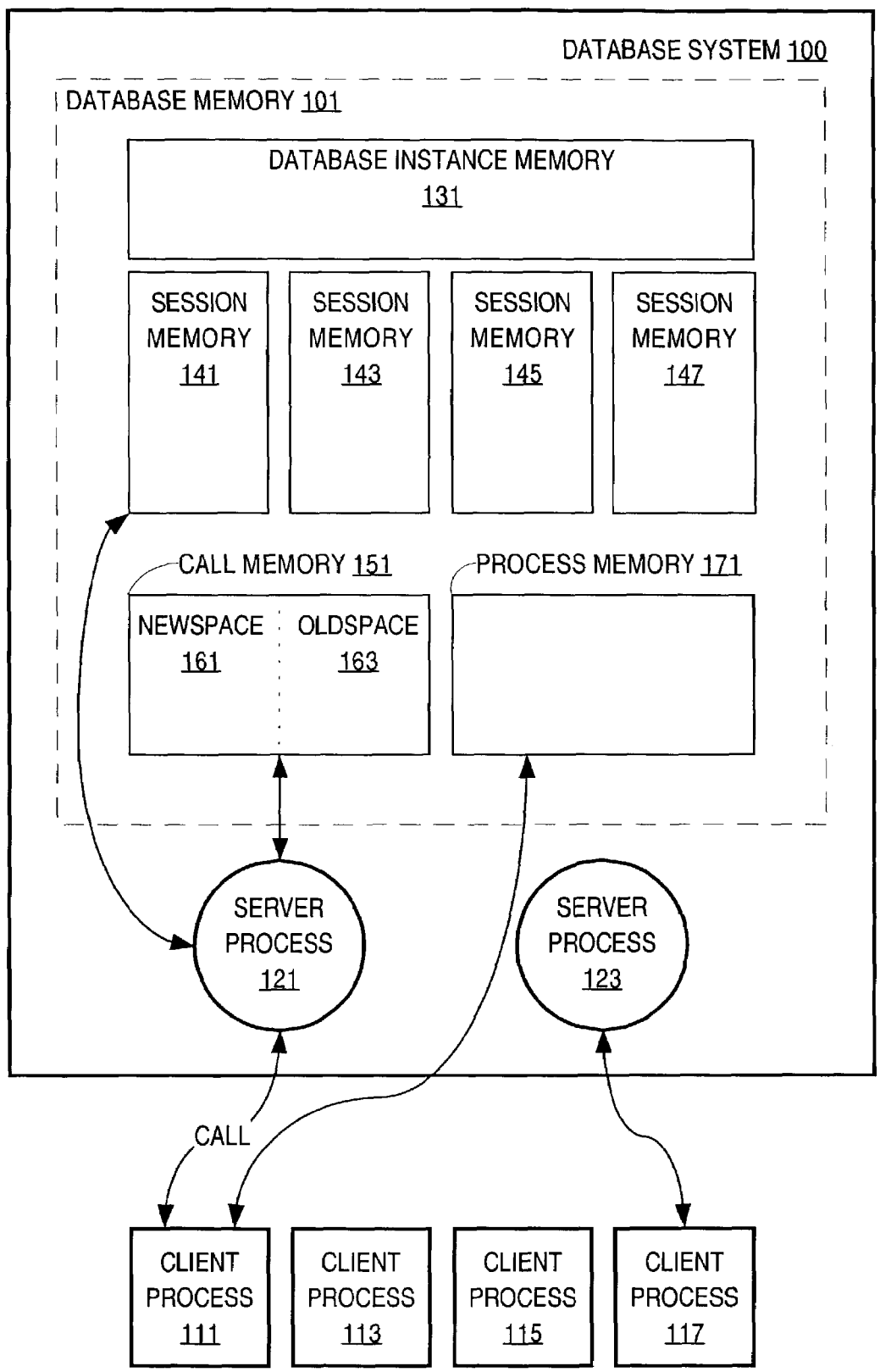
FIG. 1 depicts a memory model that can be used in conjunction with an embodiment of the present invention.

FIG. 1 schematically illustrates a multi-user database system 100 with which a run-time environment for a language such as the JAVA™ programming language may be used, although the present invention is not limited to multi-user database systems in particular and may be applied to other multi-user systems. In the illustrated configuration, client processes 111, 113, 115, and 117 establish database sessions with the database system 100. A database session refers to the establishment of a connection between a client and a database system through which a series a calls may be made. As long as the client remains connected in the database session, the client and the associated database session are referred to as being active. Active clients can submit calls to the database system 100 to request the database system 100 to perform tasks. One example of a call is a query in accordance with the Structured Query Language (SQL), and another example is a method invocation of a JAVA™ programming language object or class, defined for performing a database task for database system 100.

Database system 100 comprises, among other components, a database memory 101 for storing information useful for processing calls and a number of server processes 121 and 123 for handling individual calls. The database memory 101 includes various memory areas used to store data used by server processes 121 and 123. These memory areas include a database instance memory 131, session memories 141, 143, 145, and 147, call memory 151, and a process memory 171. It is to be understood that the number of the session memories, call memories, and process memories in FIG. 1 is merely illustrative and, in fact, the number of such memories will vary over time as various clients make various calls to the database system 100.

The database instance memory 131 is a shared memory area for storing data that is shared concurrently by more than one process. For example, shared memory area may be used store the read-only data and instructions (e.g., bytecodes of JAVA™ programming language classes) that are executed by the server processes 121 and 123. The database instance memory 131 is typically allocated and initialized at boot time of the database system 100, before clients connect to the database system 100.

When a database session is created, an area of the database memory 101 is allocated to store information for the database session. As illustrated in FIG. 1, session memories 141, 143, 145, and 147 have been allocated for clients 111, 113, 115, and 117, respectively, for each of which a separate database session has been created. Session memories 141, 143, 145, and 147 are a shared memory used to store static data, i.e., data associated with a user that is preserved for the duration of a series of calls, especially between calls issued by a client during a single database session. JAVA™ programming language static class variables are one example of such static data.

A call memory, such as call memory 151, is used to store data that is bounded by the lifetime of a call. A database call may include execution of a query or other kind of Structured Query Language (SQL) statements or a group of such statements within a database transaction. When client 111 submits a call to the database system 200, one of server processes 121 or 123 is assigned to process the call. For the duration of the call, the server process is allocated a call memory for storing data and other information for use in processing the call. For example, server process 121 uses call memory 151 and session memory 141 for processing a call submitted by client process 111.

At any given time, a server process (e.g., processes 121, 123) is assigned to process a call submitted by a single client (e.g., clients 111, 113, 115, 117). After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much fewer than the current number of active clients. Thus, database system 200 is typically configured to execute fewer server processes than the maximum number of active clients.

Process memory 171 is an area of memory that has the duration of a process and can be used to hold the virtual machine state of the process that is not user-specific. In one embodiment, use of the process memory 171 can be selectively available for specific processes. For example, process memory 171 may be available only for those processes that are started in a specific way, and sessions may be attached to such processes only they are intended to run the specific applications (e.g. an application server) that make use of the process memory 171 feature.

Layout for Class Variables

Figure 2:
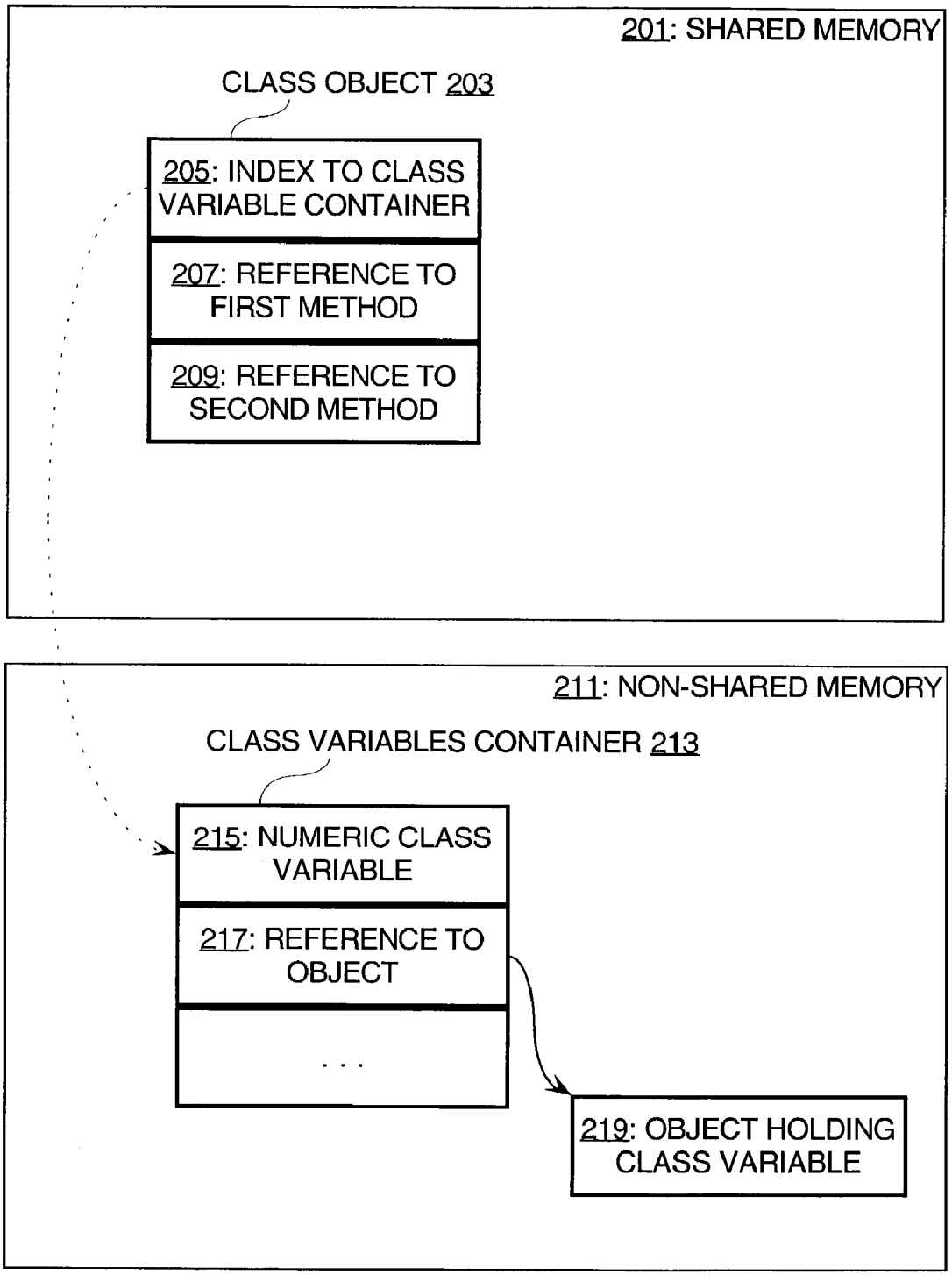
FIG. 2 is a schematic diagram depicting a layout for class variables in accordance with one embodiment of the present invention.

In accordance with one embodiment of the present invention as illustrated in FIG. 2, static class variables are laid out in a variable-format container for use with a run-time environment that manages a shared memory 201 for storing class objects so that the classes that the class objects represent can be shared among different users. The shared memory can be the database instance memory 131 of FIG. 1. An exemplary such class object 203 holds class-related data, including, but not necessarily limited to, a reference 205 to a class variable container 213 and references 207 and 209 that point to byte codes for respective methods.

The class variable container reference 205 is preferably implemented as index value into a session-specific data structure such as an array, since the data in the class object 203 is preferably shared among different users and/or sessions. Because of this sharing, the value of the class variable container reference 205 is preferably the same for all users and sessions, but the class variables container 213, however, is likely to be allocated at different addresses in the memory available to the different users and sessions. Accordingly, the user- or session-specific address of the class variables container 213 is preferably stored in a non-shared memory 210 in a data structure at a known place or referenced by a hash table indexed by a known key. The index value, accordingly, represents an offset into the data structure, which would be common for different users and session, is stored as the class variable container reference 205.

Additional details regarding the implementation of this index value can be found in the co-pending, commonly-assigned U.S. patent application Ser. No. 09/639,795 entitled METHOD AND ARTICLE FOR MANAGING REFERENCES BETWEEN OBJECTS IN MEMORIES OF DIFFERENT DURATIONS IN A RUN-TIME ENVIRONMENT, filed on Aug. 17, 2000 by Harlan Sexton et al., the contents of which are hereby incorporated by reference in their entirety herein.

The class variable container 213 is stored in a non-shared memory 211 such as session memory 141 or process memory 171, or even temporarily in call memory 151. The class variable container 213 is implemented as a variable format object containing a slot for each class variable. Two such slots are illustrated in FIG. 2 by way of example, a numeric class variable 215 and a reference 217 to an object 219 holding a non-numeric class variable. The numeric class variable 215 is generally an integer (e.g. of type "int") or other kind of numeric value. Because the numeric class variable is stored right in the slot, the value of the numeric class variable 215 can be obtained directly from the slot within the class variable container 213 without dereferencing another pointer.

The reference 217 is typically a pointer, numeric reference, external reference, or other kind of reference to an object 219 holding a class variable. Although FIG. 2 depicts the class variable object 219 in the same non-shared memory, the present invention is not so limited and the class variable object 219 can be allowed in another non-shared memory, such as call memory 151 (temporarily) or process memory 171 or, if the class-variable can be classified as a constant, in a shared memory.

Managing Class Variables

Figure 3:
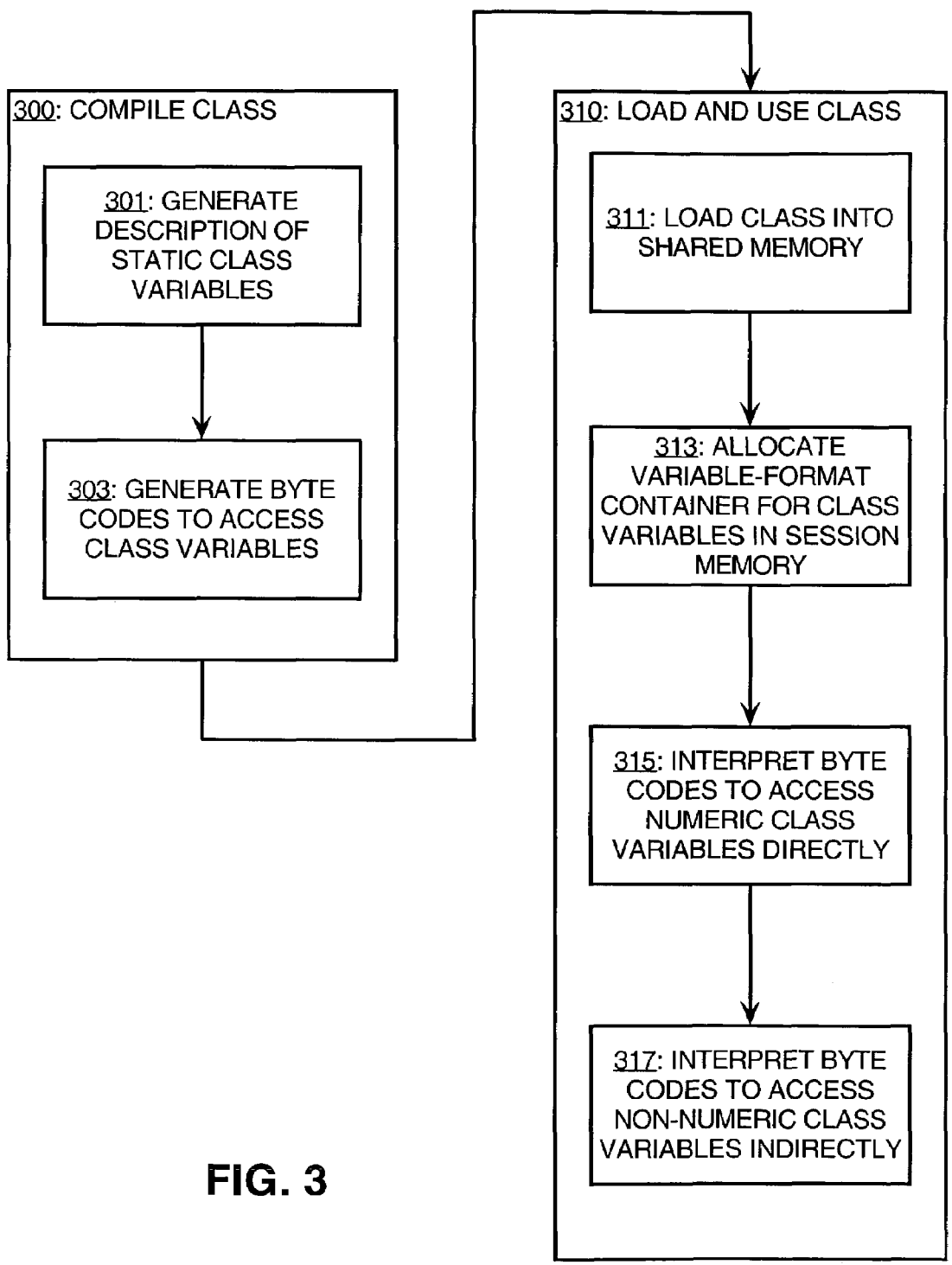
FIG. 3. is a following illustrating the operation of one embodiment of the present invention.

FIG. 3 illustrates how the class variable container 213 of FIG. 2 can be generated and utilized in accordance with an embodiment of the present invention. Specifically, the flow chart in FIG. 3 shows two phases, a class compilation phase 300 and a class loading and use phase 310.

During the class compilation phase 300, the source code for the class, which includes a declaration for the class and definition of the methods belonging to the class, are compiled into a class file. The class file includes the layout of the class indicating the class variables and methods. In particular, the compile phase 301 includes a step 301 for generating the description of the class variables that can be used by a class loader in the class loading phase 310. At step 303, byte codes are generated to access class variables without additional requirements for distinguishing numeric and non-numeric class variables.

The class loading and use phase 310 covers the acts involved in loading a class from the class file generated in the class compilation phase in the class compilation page 300 and using the loaded class. At step 311, the class object 203 is loaded into the shared memory 201 from the class file. The loaded class object 203 contains an index 205 that references the class variable container 213 to be allocated and built. At step 313, memory for the class variables container 213 is allocated in a non-shared memory that is specific to the user or session, based on information about the static class variables contained in the class file. At this point, static class initializers, if present, may be executed to initialize the values of the static class variables.

During execution of the dynamic run-time environment, either step 315, step 317, or both may be executed. At step 315, byte codes to access the a numeric class variable may be encountered; accordingly, the byte code interpreter of the dynamic run-time environment finds the class variables container 213 and accesses the numeric class variable 215 in the slot directly. On the other hand, at step 317, byte codes to access the a non-numeric class variable may be encountered, so the byte code interpreter of the dynamic run-time environment finds the class variables container 213 and accesses the class variable 219 indirectly, by dereferencing the class variable reference 217 in the class variables container 213.

This approach saves the cost of an extra indirection to access a numeric class variable, because numeric class variables are not boxed into an object in the non-shared memory 211 and referenced by the a pointer to the boxed object. As a result, access to static class numeric variables is much more efficient.

Hardware Overview

Figure 4:
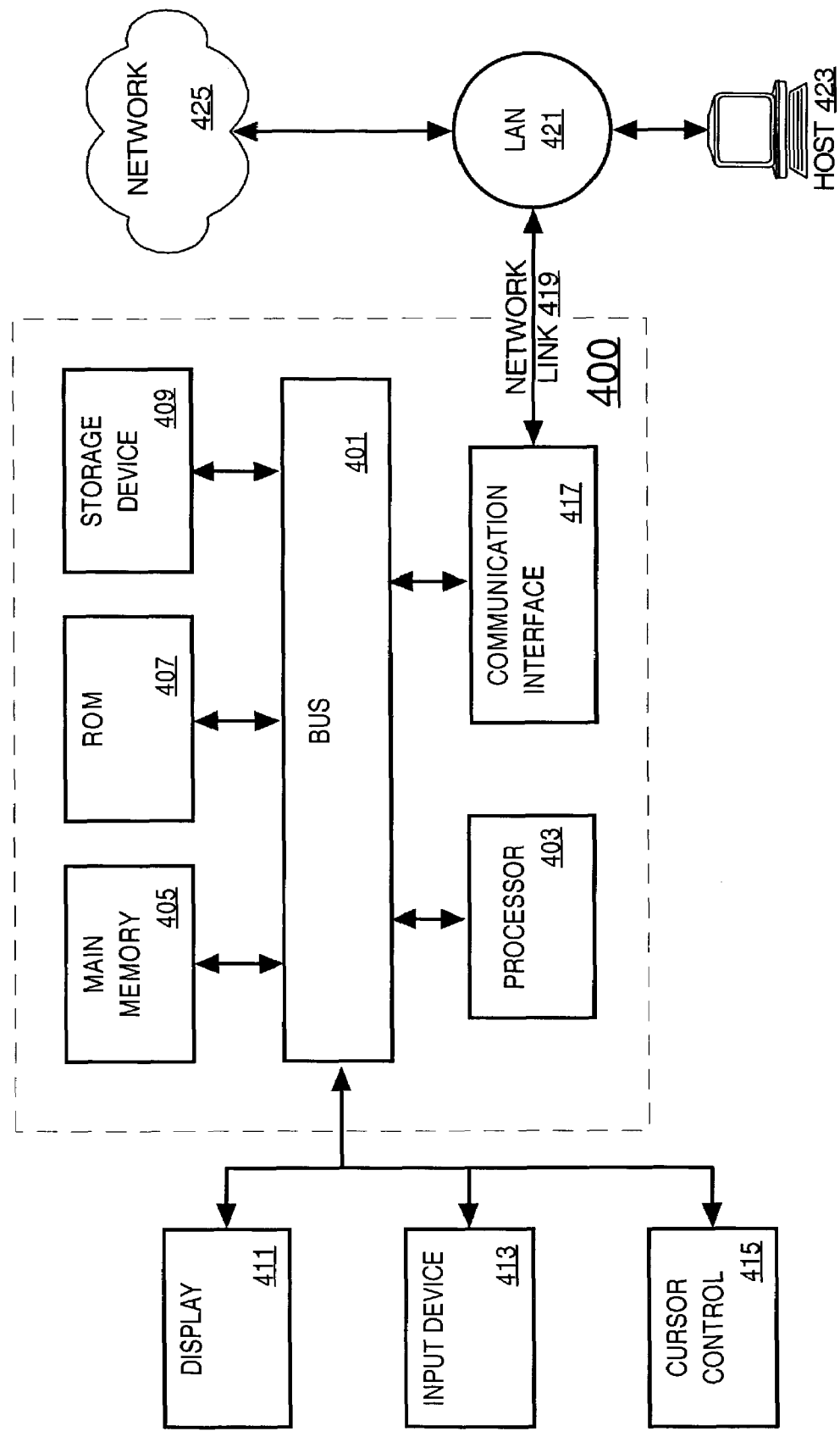
FIG. 4 depicts a computer system that can be used to implement an embodiment of the present invention.

FIG. 4 illustrates a computer system 400 upon which an embodiment according to the present invention can be implemented. The computer system 400 includes a bus 401 or other communication mechanism for communicating information and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411.

According to one embodiment of the invention, managing memory for class variables is provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and the network 425 both use electrical, electromagnetic, or optical signals to convey information and instructions. The signals through the various networks and the signals on the network link 419 and through the communication interface 417, which communicate digital data with the computer system 400, are exemplary forms of carrier waves bearing the information and instructions.

The computer system 400 can send messages and receive data, including program code, through the network(s), the network link 419, and the communication interface 417. In the Internet example, a server (not shown) might transmit requested code belonging to an application program for implementing an embodiment of the present invention through the network 425, the local network 421 and the communication interface 417. The processor 403 may execute the transmitted code while being received and/or store the code in the storage device 409, or other non-volatile storage for later execution. In this manner, the computer system 400 may obtain application code in the form of a carrier wave.

The term "computer-readable medium" as used herein refers to any medium that participates in providing instructions to the processor 405 for execution. Such a medium may take many forms, including but not limited to non-volatile media, volatile media, and transmission media. Non-volatile media include, for example, optical or magnetic disks, such as the storage device 409. Volatile media include dynamic memory, such as main memory 405. Transmission media include coaxial cables, copper wire and fiber optics, including the wires that comprise the bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method of managing memory for class variables, comprising:

loading a class based on a class file that includes a specification of class variables that belong to the class, said class being associated with a variable-format container object and one or more methods; and allocating the variable-format container object for accessing both numeric and non-numeric static class variables belonging to the class, said variable-format container object containing a plurality of slots that store either numeric values for numeric class variables or references to objects associated with non-numeric class variables, wherein said plurality of slots include a first slot storing a numeric value for a numeric class variable and a second slot storing a reference to an object for a non-numeric class variable;

using the variable-format container object to access the numeric class variable; and using the variable-format container object to access the non-numeric class variable;

wherein using the variable-format container object to access the numeric class variable is performed using at least one fewer dereference operation than would be performed when using the variable-format container object to access the non-numeric class variable.

2. A method according to claim 1, wherein:
the class is loaded into a shared memory that is shared between processes handling different sessions; and
the variable-format container object is allocated into a session-specific memory.

3. A computer-readable storage medium bearing instructions for managing memory for class variables, said instructions being arranged to perform the method according to claim 2 upon execution by one or more processors.

4. A method according to claim 1, wherein the session is bounded by a period in which a client has established a connection to a database system.

5. A computer-readable storage medium bearing instructions for managing memory for class variables, said instructions being arranged to perform the method according to claim 4 upon execution by one or more processors.

6. A method according to claim 1, further comprising:
interpreting one or more respective arrangements of bytecodes for the one or more methods belonging to the class to:
access the numeric class variable by fetching the numeric value stored at the first slot; and
access the non-numeric class variable by dereferencing the reference.

7. A computer-readable storage medium bearing instructions for managing memory for class variables, said instructions being arranged to perform the method according to claim 6 upon execution by one or more processors.

8. A computer-readable storage medium bearing instructions for managing memory for class variables, said instructions being arranged to perform the method according to claim 1 upon execution by one or more processors.

9. A method according to claim 1, wherein said reference to the variable-format container object is the same for all users of said class.

10. A computer-readable storage medium bearing instructions for managing memory for class variables, said instructions being arranged to perform the method according to claim 9 upon execution by one or more processors.

11. A method according to claim 1, wherein said class contains (a) a first reference to said variable-format container object and (b) one or more other references to said one or more methods.

12. A computer-readable storage medium bearing instructions for managing memory for class variables, said instructions being arranged to perform the method according to claim 11 upon execution by one or more processors.

13. A method of managing memory for static class variables, comprising:
loading a class into a shared memory based on a class file that includes a specification of static class variables that belong to the class, said class being associated with a variable-format container object and one or more methods;
allocating the variable-format container object into a session-specific memory for accessing both numeric and non-numeric static class variables belonging to the class, said variable-format container object containing a plurality of logically contiguous slots that store either numeric values for numeric class variables or references to objects associated with non-numeric class variables, wherein said plurality of slots include a first slot storing a numeric value for a numeric static class variable and a second slot storing a reference to an object for a non-numeric static class variable;
using the variable-format container object to access the numeric class variable;
using the variable-format container object to access the non-numeric class variable;
wherein using the variable-format container object to access the numeric class variable is performed using at least one fewer dereference operation than would be performed when using the variable-format container object to access the non-numeric class variable; and
interpreting one or more respective arrangements of bytecodes for the one or more methods belonging to the class to access the numeric class variable by fetching the numeric value stored at the first slot and access the non-numeric class variable by dereferencing the reference;
wherein the shared memory is shared between processes handling different sessions and the session is bounded by a period in which a client has established a connection to a database system.

14. A computer-readable storage medium bearing instructions for managing memory for static class variables, said instructions being arranged to perform the method according to claim 13 upon execution by one or more processors.

* * * * *